Jan. 12, 1965 R. MARSHALL 3,164,967
POULTRY COOLING METHOD AND APPARATUS
Filed Nov. 24, 1959 5 Sheets-Sheet 1
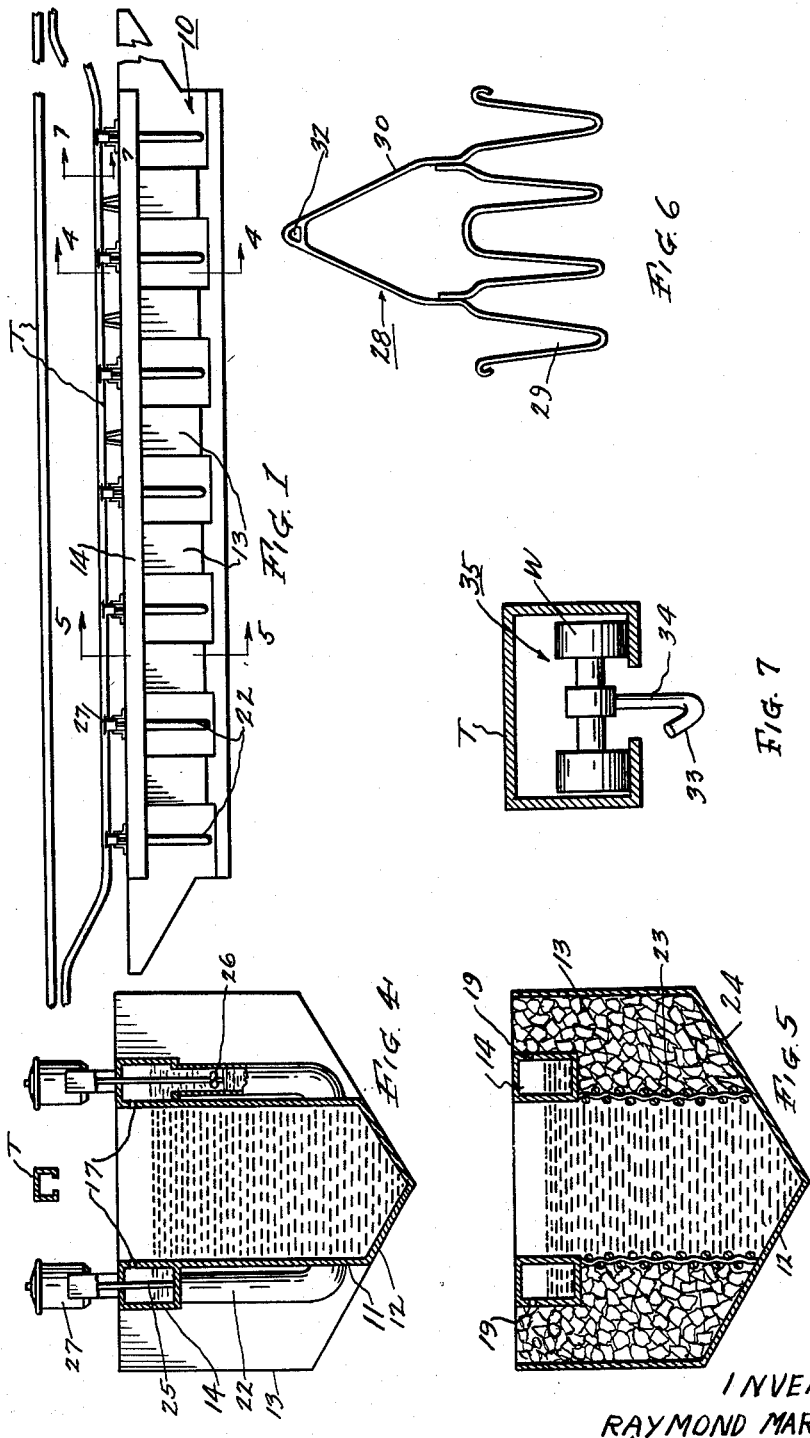
INVENTOR
RAYMOND MARSHALL
by WILLIAM E. SCHUYLER JR.
ATTORNEY

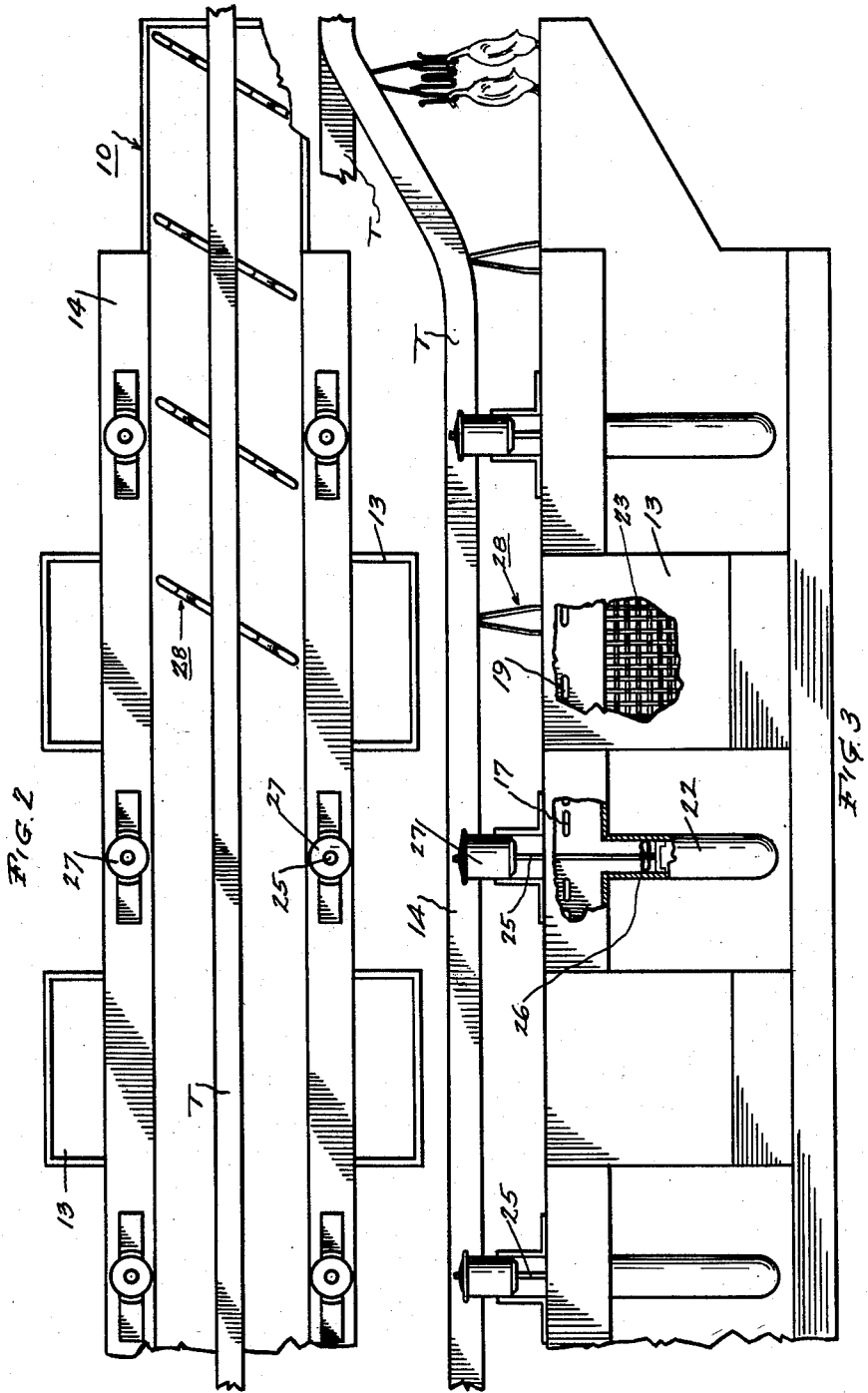

Jan. 12, 1965 R. MARSHALL 3,164,967
POULTRY COOLING METHOD AND APPARATUS
Filed Nov. 24, 1959 5 Sheets-Sheet 3
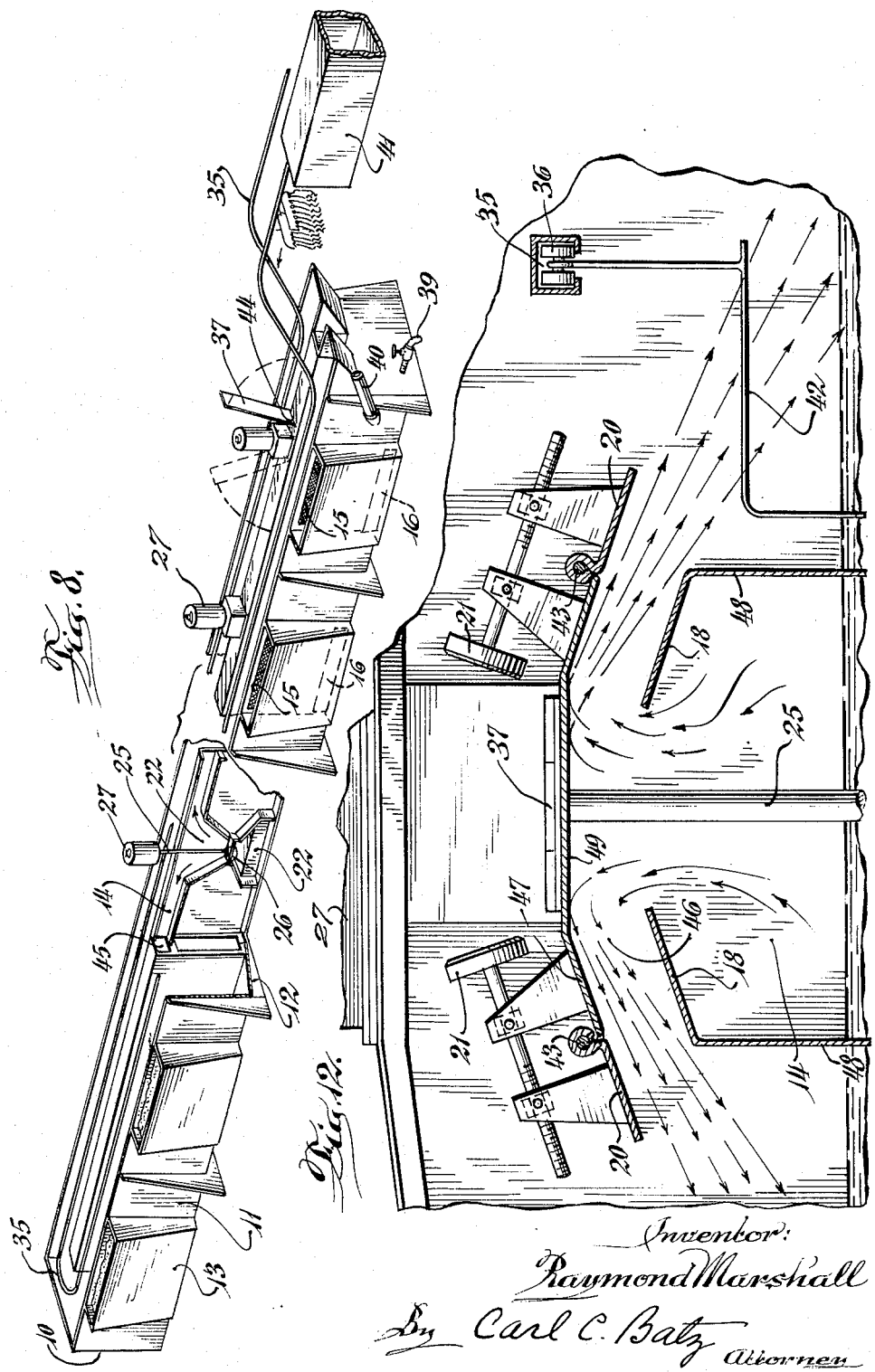
Inventor:
Raymond Marshall
By Carl C. Batz
Attorney

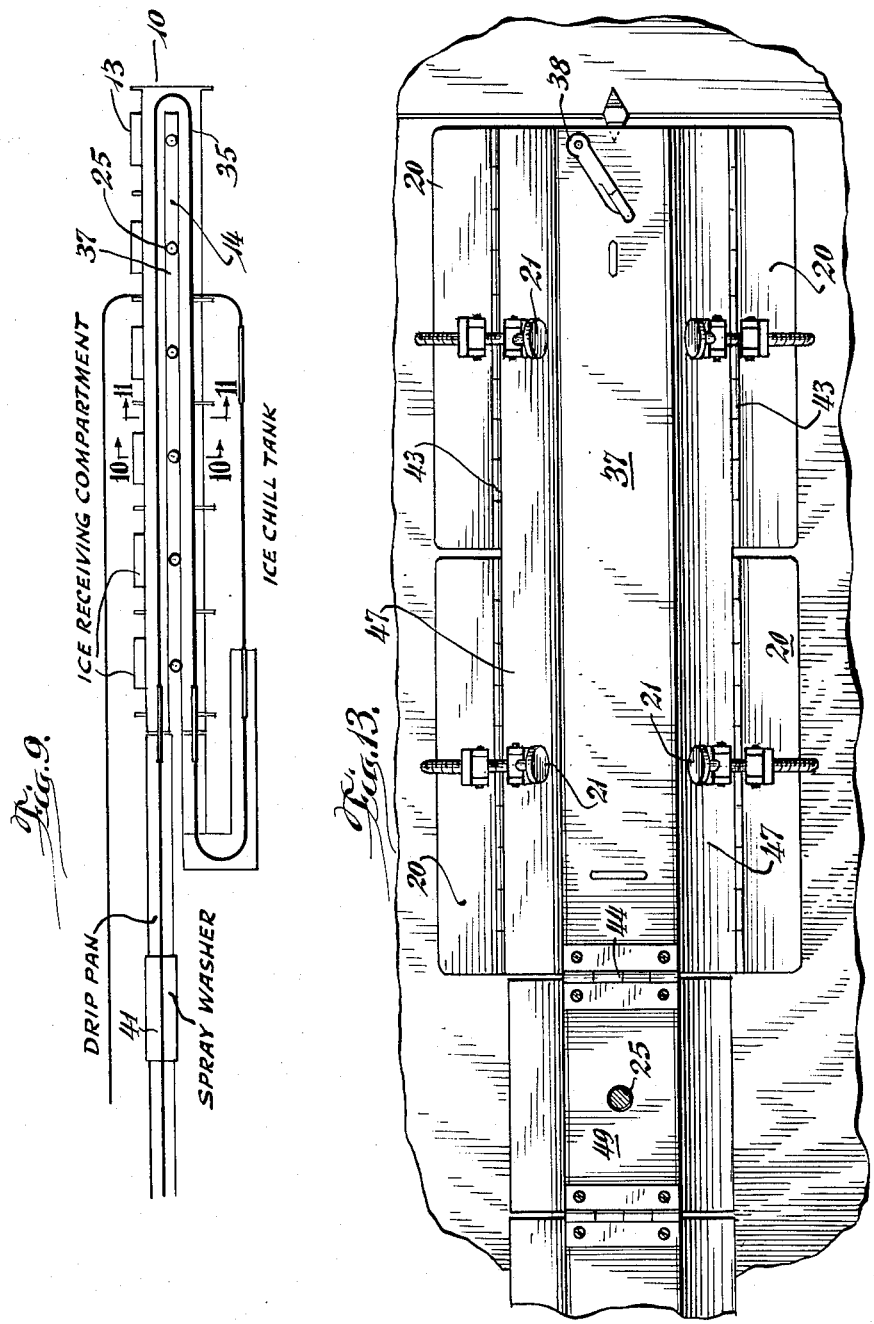

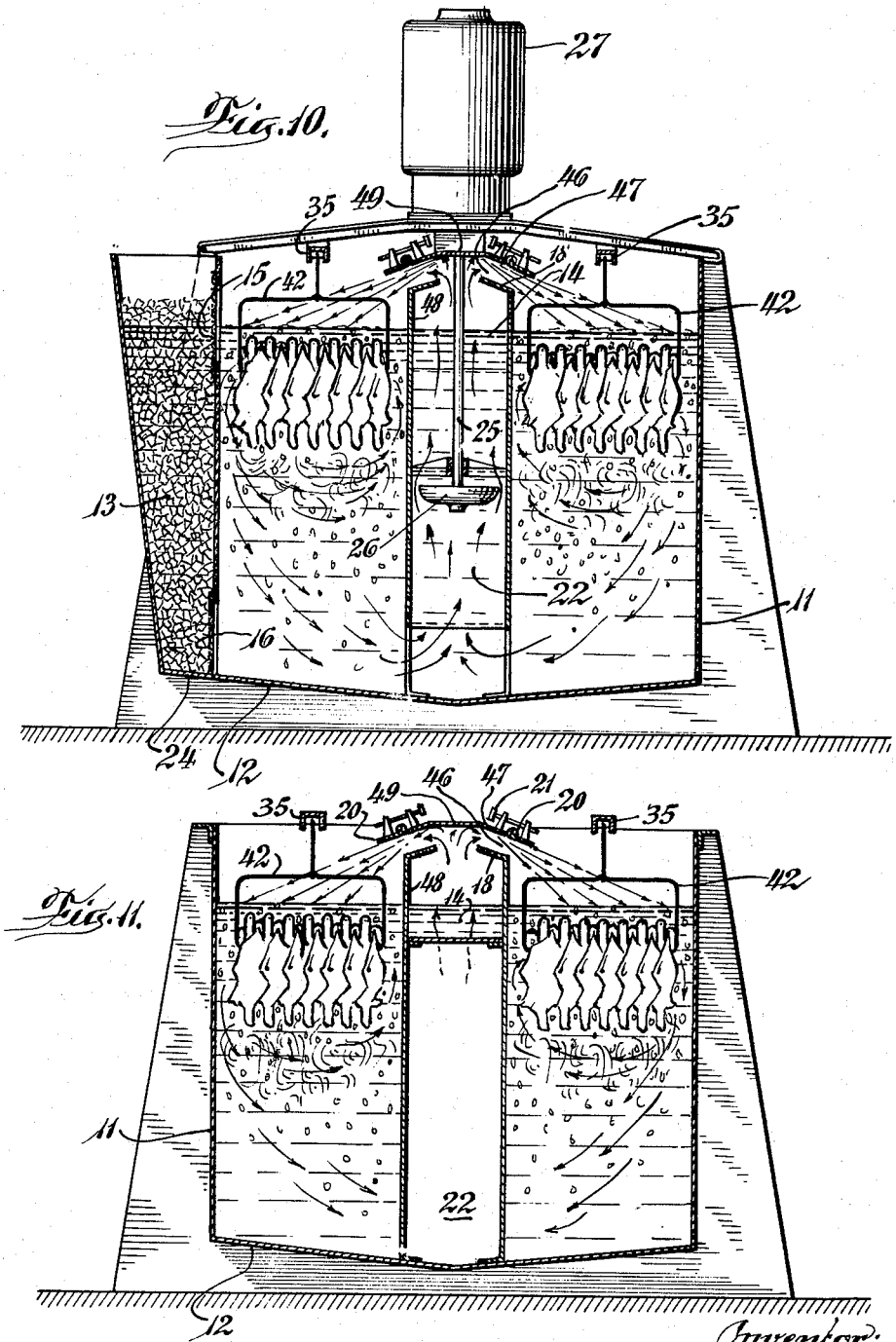

3,164,967
POULTRY COOLING METHOD AND APPARATUS
Raymond Marshall, R.R. 1, Kettleby, Ontario, Canada
Filed Nov. 24, 1959, Ser. No. 855,953
9 Claims. (Cl. 62—63)

This invention relates to a method of cooling poultry and appartus for accomplishing the cooling method.

More particularly this invention relates to a method of cooling poultry by moving it, while submerged at a predetermined depth in a liquid, through a continuous zone of cushioned turbulence, and apparatus for accomplishing this.

This application is a continuation-in-part of now abandoned application U.S. Serial No. 617,153.

Two conventional methods of cooling poultry are employed. One is the air cooling method. Poultry to be cooled is hung on racks which are wheeled into an air cooled enclosure. A second method is ice water cooling. Poultry is immersed in a tank, mounted on wheels, which contains crushed ice in water. The freshly eviscerated poultry is held in the tanks until it reaches a desired temperature, usually not exceeding 40° F.

In practice the ice water type of cooler has a capacity of about 350 birds, of average weight 4 pounds. The cooling rack, on the other hand, has a capacity of about 100 to 180 birds. The average time required for cooling 350 birds in the ice water tank is about 3 hours. About 12 hours are required to air cool birds of this size.

Air cooling causes drying of the birds. This results in economic loss to the processor and a poorer quality cooled product. The skin loses its "bloom" and is less appealing in appearance. Eviscerated poultry may lose up to 3% weight when subjected to air cooling. Ice water cooling not only yields a better appearing bird, but eliminates the drying and resulting weight loss. However, moisture gain may become a problem in ice water cooling. Excessive moisture gain harms the flavor of the poultry. The added moisture tends to "weep out" during marketing, resulting in an unsightly and more perishable product. Attempts have been made to continuously cool poultry by tumbling in ice water. It is not possible to control moisture gain with this type of cooler. By use of conventional methods weight loss or gain cannot be closely controlled.

If the ice water tank method is used, a large number of tanks are required, as well as considerable floor space. If air cooling is used, a large number of racks are required and such racks occupy floor space.

Rolling of tanks and racks over floors not only requires much labor but increases cost of maintenance. Floors need regrouting and replacing more often because of the increased traffic. Increased traffic tends to make a plant less efficient and more cluttered. Sanitation problems increase because individual tanks may be overlooked during cleaning periods, or individual tanks may be re-used several times before being properly cleaned.

Conventional ice slush cooling makes it difficult to expose all birds to equal cooling. Clumping together of birds in tanks retards heat transfer. Birds in tank bottoms soak longer but cool faster. Those at the top of a tank often do not receive proper cooling treatment. Piling birds over the tops of tanks is common. These birds receive inadequate chilling.

It is desirable that all eviscerated birds appear firm and uniform after cooling. Firm texture creates a fresher appearance more appealing to the consumer. This appearance cannot be achieved using conventional cooling methods. Tumbling and random piling which occur with conventional methods cause carcass flexibility and non-uniform appearance.

It is the industry practice to wrap edible interal organs, giblets, and the severed neck in a bag or sheet of thin material such as parchment paper. These giblets are packed in the body cavity of the bird prior to marketing. It is most desirable to cool the giblets with the bird. Labor costs and control problems are reduced if the giblets are placed in the body cavity at the time of evisceration, prior to cooling. However if cooling is not rapid enough or if the birds are tumbled during cooling it is not possible to add the giblets before cooling. The giblets being very perishable must be cooled rapidly so as to have a satisfactory storage life. Tumbling will cause the giblets to fall from the body cavity. In such cases the giblets must be cooled separately and then added back to the chilled birds at a later time.

Whatever method of cooling is used, an important factor in cooling is the rapidity with which the cooling must take place so as to reduce the bacterial action in the interval between the completed evisceration of the birds and the cooling of the birds to the required temperature. Speed of cooling effects the "shelf life" of the bird.

The objects of this invention generally are to improve on known coolers and cooling methods for eviscerated poultry.

The first object of the invention is to provide a superior method of cooling which greatly reduces cooling time while producing more uniform, better quality poultry.

A specific object of the invention is to provide a cooler of greatly increased capacity and efficiency, one which particularly reduces the cooling time to an extraordinary degree and therefore increases the "shelf life" of the birds.

Another specific object of the invention is to provide a cooler such that the birds, suspended in clusters of two or more from shackles, are immersed in an elongated ice water tank and conveyed at a selected uniform speed through the ice water, finally to merge from the tank after having been cooled to the desired temperature.

A further specific object of this invention is to provide a cooler including a tank filled with water, having receptacles filled with ice, communicating with the tank, the cooler having means of circulating the water over the ice to maintain a water temperature of approximately 32° F. as heat is extracted from the birds passed through the tank.

Another specific object of the invention is to provide a cooler including a channel filled with cold water through which the birds, suspended in clusters, are conveyed, the cooler having adjustable means for driving the cold water at high speeds into the tank to create an interior zone of controlled turbulence within the channel around the birds, thereby extracting heat from them.

Another specific object of the invention is to provide a cooler filled with ice water through which the birds are conveyed, and the means of controlling the level of the birds, with respect to the water level, so they are conveyed in an optimum manner through a cushioned zone of controlled turbulence.

Another specific object of the invention is to provide a cooler wherein water is drawn from the bottom of an elongate tank at spaced intervals lengthwise thereof, and up into an elongate tubular member above the surface of the water contained in the tank and deflected back into the tank by adjustable water control vanes positioned above the water in the tank.

In accordance with the invention, the birds are hung in clusters from substantially rigid shackles, movably suspended from an overhead conveyor and the birds submerged in an elongate channel of cool water as the shackles are moved, subsequently to rise out of the bath to be carried therebeyond; means are provided for cooling the water, drawing the cool water above the channel, and for downwardly deflecting the circulating water so the water creates a controlled churning turbulence which rapidly extracts heat from the passing birds. The birds positively positioned within the channel water by the rigid shackles are protectively cushioned by a water layer from the direct force of the downwardly jetting water. In the preferred form of the apparatus the water is cooled by chopped ice in a reservoir having communication with the inside of the tank, in one embodiment, water falling onto the chopped ice.

In drawings wherein like numerals of reference indicate corresponding parts in the various figures, FIG. 1 is a side elevation of the preferred form of apparatus made according to this invention; FIG. 2 is a fragmentary plan view of FIG. 1, on an enlarged scale; FIG. 3 is a side elevation of FIG. 2, parts being broken away; FIG. 4 is an enlarged section on line 4—4 in FIG. 1; FIG. 5 is an enlarged section on line 5—5 in FIG. 1; FIG. 6 is an enlarged front view of the bird suspending shackle; and FIG. 7 is an enlarged section on line 7—7 in FIG. 1. FIGS. 8 to 13 illustrate a second embodiment of the invention; FIG. 8 is a perspective view, partially in section; FIG. 9 is a plan view; FIG. 10 is an enlarged section on line 10—10 on FIG. 9; FIG. 11 is an enlarged section on line 11—11 on FIG. 10; FIG. 12 is an enlarged detailed partial section of FIG. 11; FIG. 13 is an enlarged detailed fragmentary plan view.

Referring now to numerals in the drawings, 10 shows an elongate tank, open at the top, and defined by side vertical walls 11 and V-shaped bottom 12. Running lengthwise of the length, and on both sides of the tank are tubular members 14, preferably of rectangular cross sections; the tubular members are closed at their opposite ends. Elongate, narrow slots 17 are provided through one wall of the tubular members affording communication between the inside of the tubular members and the inside of the tank.

Extending outwardly from the opposite side wall 11 of the tank are open-topped chambers or receptacles 13. The receptacles are in part defined by a bottom slanted wall 24 in alignment with and lying generally in the plane of one slanted wall portion of the bottom of the tank, and screens 23 closing openings formed through the side walls of the tank, co-extensive with the length of the receptacles. The receptacles may contain chopped ice. It is recognized that means other than ice may be used to chill the water to below 40° F.

The top edge of the tank is preferably flush with the upper face of the tubular members 14. Communication is afforded between the inside of the tubular members and the inside of the receptacles by means of elongate narrow slots 19. The slots 17 and 19 are disposed in a same horizontal plane. The tank is filled with water to a level slightly below the horizontally arranged slots 17 and 19.

Extending vertically and affording communication between the tubular members 14 and the tank are ducts 22, there being such ducts on both sides of the tank. The ducts are disposed between the receptacles 13, equidistant therebetween. Such ducts are also provided between the end receptacles and the opposite sides of the tank. Suitably journaled in the ducts and the tubular members are shafts 25 to the lower ends of which are secured impellers 26. The shafts are driven by suitable electric motors 27. The impellers are such, and they are rotated at such speed, that they serve to draw or displace water upwardly in the ducts 22 from the tank into the tubular members 14 to raise the level of the water in the tubular members to above the slots 17 and 19, so that water in the tubular members overflows into the tank and into the ice compartments. The agitation and circulation of the water takes place within the tank, generally from the top to bottom. Likewise, water overflows through the slots 19 from the tubular members 14 into the ice chambers 13, to fall on top of the chopped ice. Any sediment or foreign solid material is suspended in the ice falling upon the top of the chopped ice tends to cling to the ice. Growth of bacteria carried by the sediment is thereby checked.

The freshly eviscerated birds are hung in clusters from shackles 28, suspended from a conventional endless chain conveyor, which includes carriages having wheels W riding inside a box-like conventional endless chain tract T, suitably suspended from the ceiling the chain is driven at such speed that the birds will be immersed for the period of time required to lower the temperatures of the birds to one not exceeding 40° F. The shackle may be made as shown in FIG. 6. The shackle is essentially in the form of a corrugated rack presenting a plurality of spaced narrow V-shaped portions 29, which are adapted to suspend one bird, say by the hocks, the hocks being wedged in the lower end of the V-shaped portion.

The shackles include a portion 30 formed by an eye 32. The eye serves to receive a hooked portion 33 of a hook 34 operatively suspended from a carrier 35, the wheels 36 of which ride in a tract. Preferably the shackle receiving portion 29 of the hook is so directed that the shackle will hang in a vertical plane directed, not at right angles to the longitudinal axis of the tank, but at oblique angle thereto (see FIG. 2). Such an arrangement makes it possible to increase the bird carrying capacity of the shackle for a tank of given width.

Now passing on to the second embodiment illustrated by FIGS. 8 to 12 and referring by numerals to all drawings, 10 shows the elongate tank open at the top and defined by side vertical walls 11, and a V-shaped bottom 12. Drain valves 39 are located at the bottom part of the tank and walls so that tank may be drained and cleaned. An adjustable overflow pipe 40 maintains the necessary water level for optimum cooling and floats off suspended sediment. Running lengthwise in the center of the tank is a tubular member 14, preferably of rectangular cross section; the tubular member 14 has sidewalls 48 and top 49 and is closed at its opposite ends 45. Elongate water scoots 46 are formed at the upper part of the tubular member by a crimped portion 18 of the tubular member sidewall 48 and a hinged adjustable vane 20. The vane 20 is hingably attached to a crimp 47 of the tubular member top 49.

Extending outwardly from one side wall 11 of the tank are open top chambers or receptacles 13. The receptacles are defined as in the first embodiment by bottom wall 24 in alignment within the plane of the adjacent slant wall portion of the tank bottom. The internal vertical wall of the receptacle which is part of the tank side wall 11 has an elongate top screen section 15 and an elongated bottom screen section 16. The screens are substantially co-extensive with the length of the receptacles to afford communication between the inside of the tank and the receptacles. The top edge of the tank is preferably flush with the upper face of the tubular member 14.

Extending vertically cross sectionally in the center of the tank and affording communication between the tubular member 14 and the tank are ducts 22. Suitably journaled in the ducts and the tubular members are shafts 25 to the lower ends of which are secured impellers 26. The impellers are located at a point of restriction in the vertical ducts 22. The shafts are driven by electric motors 27. The impellers are such, and they are rotated at such speed, that they serve to draw or displace water upwardly in the ducts 22 in the tank, and the tubular membebr 14 so that water in the tubular member is jetted from the water scoots 46 into the tank. Thus agitation and circulation take place within the tank, generally top to bottom. The top to bottom water circulation causes water to enter the top screens 15 of the receptacles returning to the tank bottom through the lower screens 16. Sediment suspended in water tends to cling to the ice as the water flows over the ice in the receptacle. Growth of bacteria carried by the sediment is thereby checked. Water control vanes 20 rotatably attached by hinges 43 moveable by means of adjusting screws 21 control the direction of the water as it flows from the tubular member 14 over crimp 18 and back into the tank.

The top 49 of the tubular member 14 has openings which are closed by lids or covers 47 with hinges 44 provided with fastener clips 38, so that access may be gained to tubular member 14, vertical ducts 22, and impellers 26 for cleaning and repair purposes.

In the operation of this embodiment, clusters of eviscerated birds are suspended preferably by their hocks, from shackles 42. This shackle is preferably made as shown in FIG. 12. This preferred shackle is of rigid one piece construction. It is frictionally mounted between washers tightly positioned against the inner races of the bearings of conveyor wheels 36. This shackle construction resists swinging movement and prevents side to side movement of the birds thereby rigidly confining them. Preferably the shackles hang at a slight skew angle to the conventional endless chain conveyor which includes carriages having wheels 36 riding inside a box-like endless channel tract 35 suitably suspended.

Hanging the shackles at an oblique angle to the conveyor tract makes it possible to increase the capacity of the shackles for a tank of given width. The skew angle assumed by the birds passing through the water in the tank tends to create torque which transmits pressure to the top of the shackle suspension at 26 thereby further restricting movement of birds on the shackle.

The clusters of birds are preferably first passed through a conventional spray washer 41 then conveyed into the cooling apparatus. They pass the length of the tank, then reverse direction and pass through the opposite side of the tank, ascending from the tank in a cool state.

The churning zone of high heat exchange within the water channel rapidly removes heat from poultry passing through the zone. Intimate contact with a large volume of high velocity coolant accomplishes rapid cooling.

To properly control weight gain, maintain firm texture, and produce a uniform attractive appearance, while rapidly cooling poultry, the cooling method must protect the birds from the direct force of water jetting downward into the channel. Confining birds below the surface of the cooling water provides a top water layer which serves as a necessary protective cushion.

The uppermost part of each bird, usually the hocks, must be held under the surface of the water in the channel to obtain the necessary cushioning. Violent surface turbulence makes it difficult to determine the proper channel water level. Measuring the level in quiescent water is the easier procedure, and it has been found that if the water level is no lower than about one inch above the bird hocks, measured while the bird is in a quiescent state, proper cushioning will be achieved in the turbulent channel.

The present invention affords numerous advantages over conventional methods of cooling.

A cooler made in accordance with the invention appreciably reduces the cooling time, reduces labor and greatly reduces floor space, as compared with ice water tanks and cooling racks. It also reduces the incidence of bacterial contamination during the actual cooling. Also uniform and accurate moisture control is achieved by this cooler and method.

In an installation made in accordance with the present invention, in which the ice water tank is 65 feet long and roughly 4 feet wide, 2000 birds per hour of an average weight of 4 pounds have been cooled continuously from 93° to 40° F., or in other words, each bird can be cooled from 93° to 40° F. in 8 minutes. The capacity of the cooler can be increased by increasing the capacity of bird suspending shackles and increasing the length of the tanks.

The present invention provides a method of precisely and accurately controlling moisture gain during cooling. This invention closely controls the time and intensity of cooling exposure each bird receives as it is being conveyed through the channel. By regulation of water turbulence along the channel all birds receive identical contact with the cooling liquid.

This invention reduces bacterial contamination. It is essential for long shelf-like and for public health reasons that bacterial numbers be kept low. The exterior of eviscerated fowl are readily subject to bacterial contamination. Cooling water may be a factor in such contamination.

The present invention was compared to conventional style ice chill tanks as a source of bacterial contamination. The following table contains the results. Water samples were collected hourly throughout the operating period from a cooler embodying the principles of this invention. These were compared to water samples collected from conventional ice slush chilling tanks after two hour cooling periods. All figures are arithmetic averages of the logarithms of the plate counts.

| Day | Total Plate Count [1] | | Mold [2] | |
|---|---|---|---|---|
| | New Continuous | Old Method | New | Old |
| Mon | 3,200 | 14,800 | 3 | 263 |
| Tues | 1,500 | 30,000 | 18 | 143 |
| Wed | 300 | 15,400 | 2 | 252 |
| Thurs | 3,000 | 9,700 | 4 | 113 |
| Fri | 1,600 | 3,500 | 17 | 108 |

[1] Standard plate count, plate count agar.
[2] Potato dextrose agar acidified to pH 3.5.

The present invention is designed to cool eviscerated poultry. Poultry in this condition have no feathers. Defeathered poultry are more susceptible to harm from buffeting by vigorously agitated cooling water than poultry not yet dressed. Poultry for example at time of scalding immediately after killing are less susceptible to this buffeting harm. This is so because they have feathers and because rigor mortis has not yet occurred to render the muscle fibers inelastic. Excesive beating by the cooling water not only causes limpness but tends to cause an unsightly transparent gelatinous layer between the breast skin and muscle of the birds. This unsightly condition may cause consumer rejection. By conveying the poultry at a predetermined depth under the water surface of the cooler of this invention it is possible to carry them through a muffled zone of turbulence affording superior heat exchange while protecting the poultry so as to obviate the difficulties resulting from beating by the waster. Eviscerated birds, that is without lungs or feathers that entrap air, tend to be less bouyant than uneviscerated birds making it easier to maintain desired depth in water. Substantially rigid confinement afforded by the preferred shackle causes positive positioning as the birds progress along the water channel. The vacuum created by the top-to-bottom water flow further aids in positively positioning the suspended birds.

The present invention, because the birds are confined in a uniform fashion, makes it possible to produce firm textured poultry. Absence of flexing and bending leaves natural rigor mortis undisturbed, thereby retaining firmness. All birds emerging from a cooler of this present invention are firm and uniform in appearance.

The present invention, because it positively restrains the birds as they pass through turbulent cooling water permits giblet packing in the body cavities at time of evisceration.

It is to be understood that the forms of this invention herewith shown and described are to be taken as preferred examples of the same, and various changes in shape and arrangement of parts may be resorted to, without departing from the spirit of this invention, or the scope of the subjoined claims.

I claim:

1. In a cooler for eviscerated birds, an elongate tank for water which is to be maintained at substantially a predetermined level, said tank including side walls and endless conveyor including a rail in part, overlying said tank, said part of said rail having an intermediate portion, which is closer to the bottom of said tank than the other portions of said part, a plurality of bird-suspending shackles, suspended from said rail for immersing the birds as said shackles ride on said intermediate portion, and to carry the birds beyond said tank after immersion, said shackles including a member formed with spaced bird-suspending portions to suspend a cluster of said birds, means for positioning said shackles with respect to said rail so that member is directed obliquely with respect to said walls, a tubular member extending lengthwise of said tank, compartments for a refrigerant extending laterally from said tank and having communication therewith below said tubular member, said tubular members having openings therein affording communication between said member and the inside of said tank and between said member and said compartments, said openings being disposed to lie above the level of the water, ducts between said tank and said tubular member affording communication between the bottom of said tank and said tubular member, and impellers for rising water between said ducts from said tank into said tubular member to overflow through said openings into said tank and said compartments.

2. In a cooler for eviscerated birds, an elongate tank for water which is to be maintained at substantially a predetermined level, said tank including side walls, a conveyor including a rail, in part overlying said tank, said part of said rail having an intermediate portion which is closer to the bottom of said tank than the other portions of said part, a plurality of bird-suspending shackles suspended from said rail for immersing the birds as said shackles ride over said intermediate portion, and to carry the birds beyond said tank after immersion, said shackles including a horizontally directed member formed with spaced substantially V-shaped portions to suspend a cluster of said birds, means for positioning said horizontally directed member so that said member is held in a transverse position between said walls, a tubular member extending lengthwise of the longitudinal axis of said tank on each side thereof, spaced compartments for chopped ice extending laterally from either side of said tank and having communication therewith below said tubular members, said tubular members having openings therein affording communication between said members and the inside of said tank and between said members and said compartments, said openings disposed to lie above the level of water in said tank and said tank and said tubular members, affording communication between the inside of said tank and said tubular members, and impellers in said ducts for raising water from said tank into said tubular members to overflow through said openings into said tank and said compartments.

3. In a poultry cooler a tank having side walls and bottom defining a longitudinal water channel, means for maintaining water level in said channel, means for progressively conveying eviscerated poultry within said channel, a receptacle attached to at least one of said side walls adaptable to holding ice and providing a top opening, said receptacle communicating with the tank by means of an opening, a member positioned longitudinally between the side walls and on a horizontal plane defining a substantially closed water chamber extending substantially the distance of the water channel, said water chamber member having a plurality of horizontal orifices above the water level in said water channel, water control vanes useable in conjunction with said orifices to divert in a downward direction water jetting from said orifices and means for drawing water from the lower portion of said water channel into said water chamber members.

4. A cooler as set forth in claim 3 wherein confined clusters of poultry are conveyed, said clusters being placed in a horizontal line transverse to the longitudinal center of the water channel.

5. A cooler as set forth in claim 3 wherein clusters of confined poultry are conveyed at a predetermined depth in the water channel.

6. In an eviscerated poultry cooler a water channel having water maintained at less than 40° F., an elongated horizontal tubular member within said channel, said tubular member having side walls and a cover, impellers capable of drawing water from said channel into said tubular member, scoots formed by substantially parallel and coextensive crimps in side walls and top of said tubular member, said scoots being above the water level in said channel, water control vanes hingeably attached to said top crimps, and adjusting means capable of rotatably moving said vanes to thereby downwardly divert water jetting from said scoots into said channel.

7. An eviscerated poultry cooler comprising a tank having sidewalls and a bottom defining a longitudinal channel containing water, means for maintaining water in said channel at a predetermined level, a receptacle having a top opening and attached to at least one of said sidewalls, said receptacle communicating with said tank by an opening in at least one of said sidewalls between said receptacle and said tank, a duct vertically positioned between said side walls, an impeller contained within said duct capable of drawing water from the lower portion of water in said channel, an elongated horizontal water chamber closed at its ends and substantially centered between said sidewalls and substantially parallel to said sidewalls, said chamber communicating with said duct so as to receive water drawn up into said duct, elongate water scoots on both sides of said chamber above the water level in said channel, said scoots formed by crimps in the walls of said chamber, adjusting means in conujnction with said scoots capable of downwardly diverting water jetting from said orifices into said channel to create turbulence within the water in said channel, a conveyor progressively passing above said channel, and poultry shackling means positioned so as to convey clusters of poultry through said channel at a predetermined depth within said channel.

8. In a process for rapidly cooling eviscerated poultry, the steps of providing an elongated channel of water, circulating water from the top to the bottom of said channel and also circulating a portion of the water over ice so as to collect sediment on said ice to thereby check the growth of bacteria contained in said sediment and to maintain the temperature of said water below 40° F., creating a churning zone of high heat exchange within said channel by forcefully driving water onto the surface of said water, confining clusters of poultry below said water surface so as to provide a top layer which protectively cushions said poultry from the direct force of said downwardly driven water, and conveying said poultry through said zone of high heat exchange so as to rapidly cool said poultry.

9. In a poultry cooler, a water channel formed in a tank adapted to hold liquids, a receptacle for holding ice and having a top opening, said receptacle communicating with said tank by an opening between said tank and said receptacle, means for circulating water from the top to the bottom of said tank and also from the top to the bottom of said receptacle so that water flows over the ice in said receptacle whereby sediment is collected and the growth of bacteria contained in the sediment is checked, and means for progressively conveying poultry at a pre-determined depth within the water contained in said channel.

References Cited in the file of this patent

UNITED STATES PATENTS

| | | |
|---|---|---|
| 1,420,740 | Petersen | June 27, 1922 |
| 1,617,630 | Gay | Feb. 15, 1927 |
| 2,050,964 | Dean et al. | Aug. 11, 1936 |
| 2,649,615 | Sharp | Aug. 25, 1953 |
| 2,920,462 | Roser et al. | Jan. 12, 1960 |
| 2,942,429 | Van Dolah et al. | June 28, 1960 |